April 11, 1961 W. R. NAUMANN 2,979,147
COUPLING FOR VEHICLE HALF AXLE DRIVE ASSEMBLY
Filed May 19, 1955 2 Sheets-Sheet 1
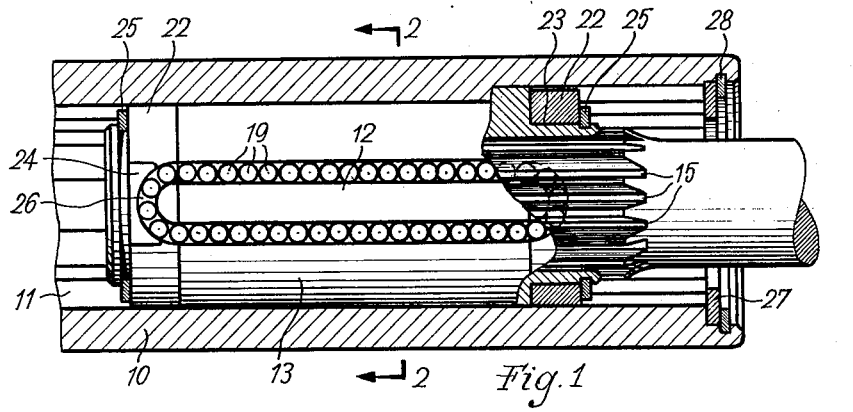
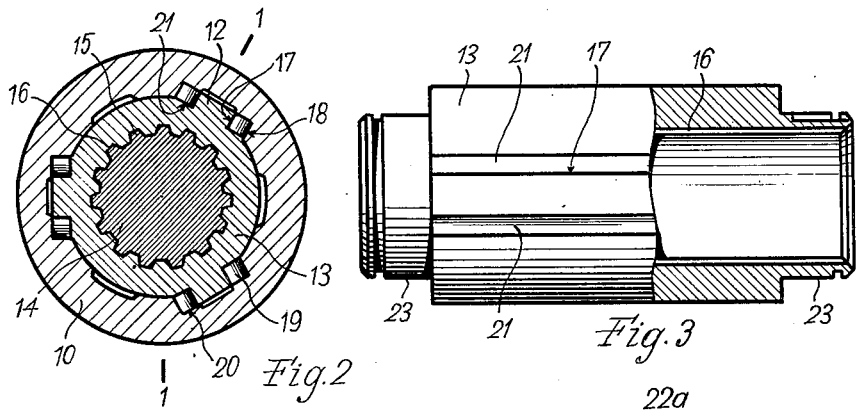
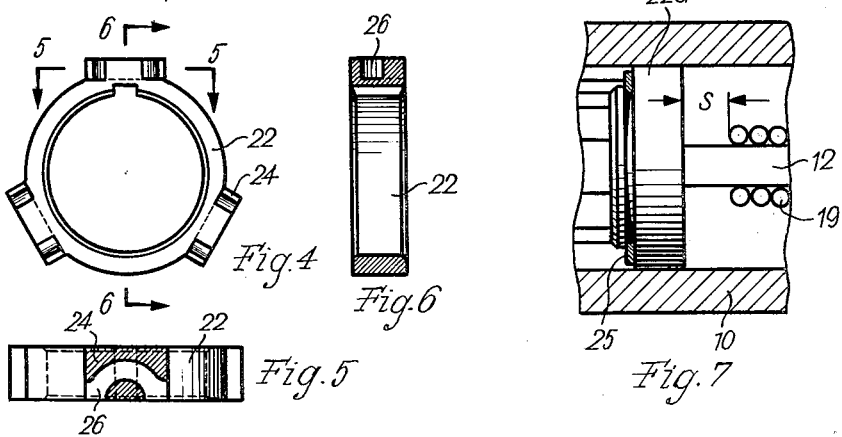
INVENTOR
WILLY R. NAUMANN
BY Dicke and Craig
ATTORNEYS.

United States Patent Office 2,979,147
Patented Apr. 11, 1961

2,979,147

COUPLING FOR VEHICLE HALF AXLE DRIVE ASSEMBLY

Willy R. Naumann, Stuttgart-Degerloch, Germany, assignor to Daimler-Benz Aktiengesellschaft, Stuttgart-Unterturkheim, Germany Filed May 19, 1955, Ser. No. 509,583

Claims priority, application Germany May 19, 1954

7 Claims. (Cl. 180—73)

The present invention relates to a driving coupling, that is, a coupling which is used, for example, for driving motor vehicles, and which engages two elements which are movable in an axial direction relative to each other and are in engagement with each other so as to transmit a rotary motion from one to the other about the same axis. More particularly, the present invention relates to the use of such a coupling in the form of a spline shaft connection, the two parts of which are movable relative to each other in a longitudinal direction for driving a Cardan shaft which is mounted within a pivoting half-axle so as to drive a wheel of a car, and it relates especially to the use of such a coupling in connection with a universal joint for the drive shaft, wherein such joint is located remote from the pivotal axis of the half-axle, and wherein the latter is preferably resiliently suspended by frictionless springs, such as, for example, unguided coil springs.

The forces required for shifting spline shafts of the usual cross-sectional shape usually have to be relatively large, inasmuch as their size depends upon the torque to be transmitted. In drive axles of motor vehicles which are designed in the form of Cardan shafts, the sliding friction caused by the customary cross-sectional shape of the spline shaft may sometimes become so large that the resilient vertical movement of the wheel will be impeded. The advantage intended by the suspension of the wheels or half-axles by means of frictionless coil springs may thus be offset by the friction occurring on the outer surfaces of the spline shafts. This disadvantage will increase with an increase in the distance between the universal joint for driving the Cardan shaft and the pivotal axis or axes of the half-axles, since in such a case the relative longitudinal displacement in axial direction along the splined surfaces, as well as the effort required to overcome the friction between these surfaces will be quite large.

It is therefore an object of the present invention to provide a coupling, the operation of which only entails a very small frictional force which may be easily overcome, despite the fact that the axial movability and the torque required to be transmitted might be quite large.

An important feature of the present invention therefore consists in providing the inner shaft portion with key-shaped, longitudinally extending projections which are mounted within keyways of corresponding width which are provided within the outer shaft portion, and to interpose between such projections and keyways suitable anti-friction bearing elements in such a manner that the shaft portions, while safely taking up the torque, are able to slide in axial direction relative to each other, owing to the fact that the bearing elements which are arranged in rows one behind the other, roll along the respective surfaces.

A further object of the present invention resides in providing a coupling of the nature as described which only requires relatively short rows of bearing elements and in which, when the shaft portions telescope within each other, some of the bearing elements of one row may also be utilized within another row.

A feature of the invention for accomplishing this object consists in the provision of return passages through which the bearing elements from the keyways of one row may pass to the keyways of another row.

Another object of the present invention resides in providing the keys and keyways of the telescoping shaft portions with suitable bearing surfaces for guiding the intermediate bearing elements, and in devising a very simple and inexpensive method for producing such bearing surfaces.

A further object of the present invention is to provide such bearing surfaces so as to afford a positive and reliable bearing or guiding effect for supporting the bearing elements intermediate the two telescoping shaft portions. Still another object of the present invention is to provide suitable means for taking up the peripheral forces acting on the shafts by distributing the same as evenly and uniformly as possible along the peripheral surface of the shafts.

Further objects, features, and advantages of the present invention will be apparent from the following detailed description of several embodiments thereof, as well as from the accompanying drawings, in which Fig. 1 shows a partial longitudinal section taken along line 1—1 of Fig. 2;

Fig. 2 shows a cross section taken along line 2—2 of Fig. 1;

Fig. 3 shows a sliding sleeve, partly in a side view and partly in a longitudinal section;

Fig. 4 shows a front view of an end ring;

Figure 8:
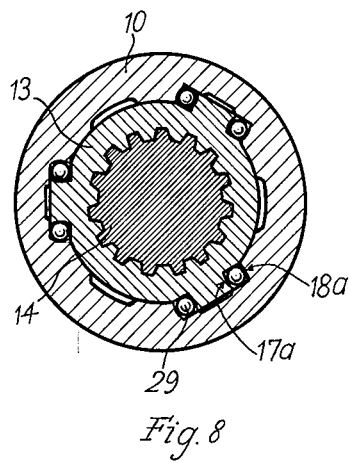
Figure 9:
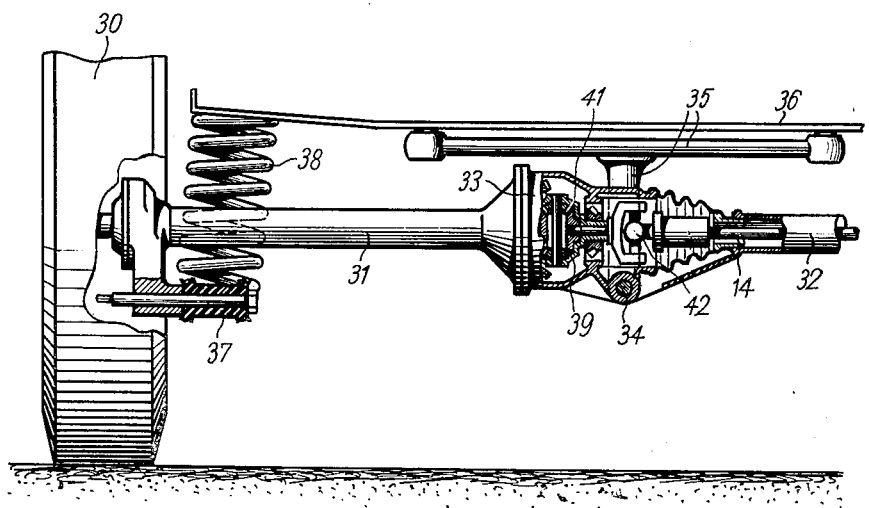

Figs. 5 and 6 shows cross sections taken along lines 5—5 and 6—6, respectively, of the invention;

Fig. 7 shows a partial section similar to Fig. 1 through another embodiment of the invention;

Fig. 8 shows a section similar to Fig. 2 through a third embodiment of the invention; while Fig. 9 shows an embodiment of the invention as being applied to a swing-axle suspension of a motor vehicle.

Referring to the drawings, and first to Figs. 1 to 6, the hollow shaft end 10 of the bifurcated part of a universal joint, the remainder of which is not shown in the drawings, is provided on its inside with substantially rectangular keyways 11 having parallel axes. A sliding sleeve 13 is telescoped within the hollow shaft 10 and integrally provided with peripheral key portions 12 which engage in the keyways 11. The spline shaft 14 of the joint is provided with keys 15 which engage in splines 16 within the sliding sleeve 13 so as to be easily disengaged therefrom in an axial direction. Short rollers 19 which are of substantially square-shaped cross section are interposed between the sides 17 of the key portions 12 and the sides 18 of the keyways 11. The outer faces of the rollers 19 are guided by the base 20 of the keyways 11, as well as by flattened surfaces 21 on the sliding sleeve 13.

The movement of the rollers 19 in an axial direction which occurs when the spline shaft 14 and the sliding sleeve 13 are shifted relative to the socket end 10 of the bifurcated part of the universal joint is limited by end rings 22 which are mounted on the reduced ends 23 of the sliding sleeve 13 and are secured thereto in an axial direction by spring rings 25. The keys 24 of the end rings 22 contain arcuate channels 26 as shown particularly in Fig. 5, whereby the direction of movement of the rollers 19 which are sliding or rolling along one side of keys 12 will, at their end, be reversed so they will return along the other side of the keys in the other direction, thus producing a continuous caterpillar movement around each key.

In another embodiment of the shaft connection, as shown in Fig. 7, the channels 26 of the embodiment according to Figures 1 to 6 are omitted and the end rings 22a terminate at the same point as keys 12. While in the embodiment shown in Figs. 1 to 6 the play between the rollers 19 substantially corresponds to that provided in needle bearings of similar size, the total play $s$ of all the rollers 19 taken together, with the end rings 22a terminating evenly with the keys 12, preferably amounts to the size of the diameter of one roller 19 or to a multiple thereof. Consequently the rollers 19 which move at about half of the relative speed of the shaft portions have adequate freedom to move within the sliding sleeve. A bearing cage for guiding the short square-shaped rollers will not, in this case, be required as they cannot turn to an inclined position.

The end positions of the sliding sleeve 13 within the socket 10 of the bifurcated part of the universal joint are determined by washers 27 and spring rings 28.

In the embodiment shown in Fig. 8, balls 29 are provided in place of the rollers 19, and are guided between concave side walls 17a and 18a of the sleeve 13 and the socket 10, respectively.

A preferred application of the invention is illustrated in Fig. 9, wherein the rear wheels 30 of a motor vehicle are mounted on pivoting half-axles 31 and 32. The half-axle 31 includes or forms a part of the differential housing 33. Half-axles 31 and 32 are mounted on a pivot 34 which is disposed at a low point and with its axis extending in the direction of travel, and which is mounted on an arm 35, which, in turn, is mounted, for example, by resilient means, on the car body 36. The half-axles 31 and 32 are supported relative to the car body 36 by longitudinally extending arms 37 and are resiliently suspended relative to the car body by coil springs 38. The wheels 30 are driven by the engine through the gear transmission, the differential 39, and Cardan shafts 14 which are provided within the pivotal half-axles and consist of a short shaft 41 and a universal joint 42, the center of which is disposed substantially vertically above the pivot 34. The right arm of the universal joint 42 is connected to the sleevelike socket 10, while shaft 14 is mounted by means of its end within socket 10 in the manner according to the invention. The disposal of the joints 34 and 42 at different points remote from each other permits a very extensive relative movement of the parts 10 and 14 during the resilient vertical movement of the wheels.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. A coupling for engaging two parts for rotary driving movement relative to each other about a common axis, said parts being movable in the axial direction relative to each other, and comprising an inner member, an outer member concentric with said inner member, said inner member having radial outer projections extending in the longitudinal direction thereof and having substantially radial lateral surfaces, said outer member having recesses on the inside thereof, said recesses extending in the longitudinal direction thereof, said projections engaging within said recesses, said recesses forming grooves having substantially radial lateral surfaces and a width in the peripheral direction greater than said outer projections thereby forming raceways intermediate said projections and said grooves on both sides thereof, a plurality of rotatable anti-friction elements within said raceways, said anti-friction elements engaging with said lateral surfaces of said projections and grooves and forming rows of anti-friction elements extending longitudinally in the axial direction within said raceways, said inner member having annular portions of reduced diameter at the longitudinal ends of said projections, and at least one ring mounted on each of said annular portions and terminating said raceways in the axial direction, said rings being provided with arcuate grooves extending along an arc from one raceway to another and adapted to permit said anti-friction elements to move from one raceway to the other and to move within said raceways in opposite directions of each other, said rings being provided with radial projections containing said arcuate grooves, said last-named projections engaging with the walls of said grooves in said outer shaft portion so as to be substantially without play in a peripheral direction.

2. A coupling as defined in claim 1, wherein said projections and grooves of said inner and outer members, respectively, comprise not more nor less than three projections and three grooves uniformly distributed along the outer and inner periphery thereof, respectively.

3. A coupling for engaging two parts for rotary driving movement relative to each other about a common axis, said parts being movable in the axial direction relative to each other, and comprising an inner member, an outer member concentric with said inner member, said inner member having radial outer projections extending in the longitudinal direction thereof and having substantially radial lateral surfaces, said outer member having recesses on the inside thereof, said recesses extending in the longitudinal direction thereof, said projections engaging within said recesses, said recesses forming grooves having substantially radial lateral surfaces and a width in the peripheral direction greater than said outer projections thereby forming raceways intermediate said projections and said grooves on both sides thereof, a plurality of rotatable anti-friction elements within said raceways, said anti-friction elements engaging with said lateral surfaces of said projections and grooves and forming rows of anti-friction elements extending longitudinally in the axial direction within said raceways, said inner member having annular portions of reduced diameter at the longitudinal ends of said projections, and at least one ring mounted on each of said annular portions and terminating said raceways in the axial direction, said rings on the side facing said raceways being provided with end surfaces extending transversely of said raceways for limiting said raceways at the ends thereof, each of said rows of anti-friction elements having a total play intermediate all of said elements within each said row, said total play being larger than the diameter of one of said elements.

4. In a motor vehicle having an upper body, at least two wheels facing each other on opposite sides of said vehicle, a pivotable half-axle carrying each of said wheels and adapted to move upwardly and downwardly relative to said upper body, means for pivotally supporting said half-axles on said upper body, said means comprising a pivot member extending longitudinally of said motor vehicle, the inner ends of said half-axles being mounted on said pivot member and turning thereabout, means for driving said wheels, said last-named means comprising a drive shaft within one of said half-axles, a second drive shaft for driving said first drive shaft, said shafts having pivotal connecting means therebetween adapting said shafts for relative angular movement about a pivot point in said connecting means common to the axes of said shafts, said pivot point being spaced from the axis of said pivot member, resilient means for resiliently suspending said half-axles relative to said upper body, said connecting means comprising an inner shaft portion and an outer shaft portion concentric therewith, anti-friction bearing means disposed intermediate said shaft portions and operatively connecting said shaft portions with each other for rotation in unison and for relative axial movement, said bearing means comprising interengaging projections and recesses provided with substantially radial surfaces forming raceways extending axially of said shaft portions, roller anti-friction elements disposed between said projections and recesses and forming a series of rows, said roller anti-friction elements being adapted to move along said surfaces, means for guiding said roller anti-friction elements comprising guiding surfaces on said inner shaft portion and guiding surfaces on said outer shaft portion, said first-named guiding surfaces being disposed parallel to said second-named guiding surfaces, the axes of said roller anti-friction elements intersecting said first-named and said second-named guiding surfaces, said inner shaft portion being provided at the longitudinal ends of said projections with portions of reduced diameter, and a ring mounted on each of said portions of reduced diameter, each said ring comprising a plurality of radial projections each having walls in contact with two of said substantially radial surfaces of one of said recesses, each of said radial projections being provided with arcuate channel means cooperating with said raceways for passage of said roller anti-friction elements.

5. In a motor vehicle having an upper body, at least two wheels facing each other on opposite sides of said vehicle, a pivotable half-axle carrying each of said wheels and adapted to move upwardly and downwardly relative to said upper body, means for pivotally supporting said half-axles on said upper body, said means comprising a pivot member extending longitudinally of said motor vehicle, the inner ends of said half-axles being mounted on said pivot member and turning thereabout, means for driving said wheels, said last-named means comprising a drive shaft within one of said half-axles, a second drive shaft for driving said first drive shaft, said shafts having pivotal connecting means therebetween adapting said shafts for relative angular movement about a pivot point in said connecting means common to the axes of said shafts, said pivot point being spaced from the axis of said pivot member, resilient means for resiliently suspending said half-axles relative to said upper body, said connecting means comprising an inner shaft portion and an outer shaft portion concentric therewith, anti-friction bearing means disposed intermediate said shaft portions and operatively connecting said shaft portions with each other for rotation in unison and for relative axial movement, said bearing means comprising interengaging projections and recesses provided with substantially radial surfaces forming raceways extending axially of said shaft portions, rotatable anti-friction elements disposed between said projections and recesses and forming a series of rows, said rotatable antifriction elements being adapted to move along said surfaces, means for guiding said rotatable anti-friction elements comprising guiding surfaces on said inner shaft portion and guiding surfaces on said outer shaft portion, said first-named guiding surfaces being disposed parallel to said second-named guiding surfaces, the axes of said rotatable anti-friction elements intersecting said first-named and said second-named guiding surfaces, said main shaft portion having annular portions of reduced diameter at the longitudinal ends of said projections, and a ring mounted on each of said annular portions, each said ring including portions immediately adjacent said raceways at one end of each thereof and in cooperative relationship with said anti-friction elements.

6. The combination according to claim 5, wherein each of said last-named portions comprises means forming an arcuate groove connecting two of said raceways and constituting a channel for said anti-friction elements.

7. The combination according to claim 5, wherein each said ring comprises a flat end surface, said flat end surface being in contact with said projections at one of said longitudinal ends, said flat end surface having surface portions respectively extending across the said end of each of said raceways to limit the travel of said anti-friction elements in said raceways, said portions included in each said ring being comprised by said surface portions.

References Cited in the file of this patent

UNITED STATES PATENTS

| 851,728 | Bayrer | Apr. 30, 1907 |
| 1,140,905 | Klausmeyer | May 25, 1915 |
| 1,918,108 | Jonkhoff | July 11, 1933 |
| 1,937,653 | Haltenberger | Dec. 5, 1933 |
| 2,055,975 | Haltenberger | Sept. 29, 1936 |
| 2,105,369 | Paton | Jan. 11, 1938 |
| 2,559,292 | Ferger | July 3, 1951 |
| 2,818,128 | Uhlenhaut et al. | Dec. 31, 1957 |

FOREIGN PATENTS

| 975,115 | France | Oct. 11, 1950 |
| 513,421 | Great Britain | Oct. 12, 1939 |